United States Patent
Hotta (10) Patent No.: US 10,174,695 B2
(45) Date of Patent: Jan. 8, 2019

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Shintaro Hotta, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 200 days.

(21) Appl. No.: 15/175,493

(22) Filed: Jun. 7, 2016

(65) Prior Publication Data

US 2016/0363070 A1    Dec. 15, 2016

(30) Foreign Application Priority Data

Jun. 9, 2015 (JP) ................................ 2015-116857

(51) Int. Cl.
| | | |
|---|---|---|
| F01N 3/00 | (2006.01) |
| F02D 41/02 | (2006.01) |
| F01N 3/20 | (2006.01) |
| F02D 41/14 | (2006.01) |
| F02D 41/00 | (2006.01) |
| F02M 26/06 | (2016.01) |
| F02M 26/15 | (2016.01) |
| F02D 41/30 | (2006.01) |

(Continued)

(52) U.S. Cl.
CPC ......... *F02D 41/0235* (2013.01); *F01N 3/208* (2013.01); *F01N 3/2073* (2013.01); *F02D 41/0047* (2013.01); *F02D 41/0052* (2013.01); *F02D 41/0055* (2013.01); *F02D 41/1454* (2013.01); *F02D 41/3064* (2013.01); *F02M 26/06* (2016.02); *F02M 26/15* (2016.02); *F01N 3/0842* (2013.01); *F01N 3/2066* (2013.01); *F02D 13/0215* (2013.01); *F02D 41/1475* (2013.01); *F02D 2041/0265* (2013.01); *F02D 2200/0802* (2013.01); *Y02T 10/24* (2013.01); *Y02T 10/47* (2013.01)

(58) Field of Classification Search
CPC ............ F02D 41/0235; F02D 41/3064; F02D 41/0007
See application file for complete search history.

(56) References Cited

U.S. PATENT DOCUMENTS

| | | |
|---|---|---|
| 8,661,789 B2 | 3/2014 | Sakurai et al. |
| 8,931,265 B2 | 1/2015 | Ramamurthy |

(Continued)

FOREIGN PATENT DOCUMENTS

| | | |
|---|---|---|
| JP | H1047042 A | 2/1998 |
| JP | 2014-001682 A | 1/2014 |

(Continued)

*Primary Examiner* — Mark Laurenzi
*Assistant Examiner* — Jason Sheppard
(74) *Attorney, Agent, or Firm* — Hunton Andrews Kurth LLP (57) ABSTRACT

When switching an operation mode from a stoichiometric mode to a lean mode, a rich spike that supplies excessive fuel relative to a theoretical air-fuel ratio is executed. If the temperature of the SCR is greater than or equal to an upper limit temperature at a time of the switching, after execution of the rich spike, the switching to the lean mode is executed after executing transient control that makes the EGR rate higher than EGR rate in the lean mode and makes the in-cylinder air-fuel ratio an air-fuel ratio between the theoretical air-fuel ratio and the air-fuel ratio in the lean mode.

3 Claims, 6 Drawing Sheets (51) Int. Cl.
 *F01N 3/08* (2006.01)
 *F02D 13/02* (2006.01)

(56) References Cited

U.S. PATENT DOCUMENTS

| | | |
|---|---|---|
| 2014/0278003 A1 | 9/2014 | Kim et al. |
| 2014/0356237 A1 | 12/2014 | Sakurai |
| 2015/0218994 A1 | 8/2015 | Nogawa |

FOREIGN PATENT DOCUMENTS

| | | |
|---|---|---|
| JP | 2014-101836 A | 6/2014 |
| WO | 2013118252 A1 | 8/2013 |
| WO | 2014024274 A1 | 2/2014 |

CONTROL DEVICE FOR INTERNAL COMBUSTION ENGINE

CROSS-REFERENCE TO RELATED APPLICATION

The present application claims priority under 35 U.S.C. § 119 to Japanese Patent Application No. 2015-116857, filed Jun. 9, 2015. The contents of this application are incorporated herein by reference in their entirety.

FIELD

The present disclosure relates to a control device for an internal combustion engine, and more particularly to a control device for an internal combustion engine including a selective catalytic reduction-type device in an exhaust passage and also including a NOx storage-reduction catalytic device on an upstream side thereof.

BACKGROUND

A selective catalytic reduction-type catalyst (hereunder, also referred to as "SCR") is known as a catalyst that can purify NOx contained in exhaust gas. An SCR has a function that adsorbs ammonia ($NH_3$), and can selectively reduce NOx contained in exhaust gas by means of $NH_3$.

In Japanese Patent Laid-Open No. 2014-001682, a configuration is disclosed in which a NOx storage-reduction catalyst (hereunder, also referred to as "NSR") is disposed upstream of an SCR. The NSR stores NOx contained in exhaust gas under a lean atmosphere, and when a reducing agent such as HC or CO is supplied from upstream, the NSR releases the stored NOx to cause the NOx to react with the reducing agent to thereby reduce the NOx to $NH_3$ and $N_2$. Hence, according to this configuration, the $NH_3$ generated when NOx is reduced at the NSR can be adsorbed by the SCR. Further, by utilizing the $NH_3$, NOx that passes by the NSR or NOx that oozes out from the NSR can be selectively reduced at the SCR. That is, according to this configuration, special means such as urea addition means for causing the SCR to adsorb $NH_3$ is not required.

Further, Japanese Patent Laid-Open No. 2014-001682, discloses that, when switching from stoichiometric operation in which operation is performed with an in-cylinder air-fuel ratio that is set at a theoretical air-fuel ratio to lean operation in which operation is performed with an in-cylinder air-fuel ratio that is set to an air-fuel ratio that is leaner in fuel than the theoretical air-fuel ratio, a so-called "rich spike" is executed that enriches for a short period of time the air-fuel ratio of exhaust gas that flows into the NSR. Although the amount of $NH_3$ adsorbed by the SCR decreases during stoichiometric operation, the $NH_3$ adsorption amount of the SCR can be restored by executing a rich spike as described above to supply a reducing agent to the NSR to cause the NSR to generate $NH_3$.

SUMMARY

The reason the $NH_3$ adsorption amount of the SCR decreases during stoichiometric operation is that $NH_3$ oxidizes under a high temperature environment. There is an appropriate range for the temperature of an SCR, and it is known that oxidation of $NH_3$ proceeds if the SCR temperature becomes greater than or equal to an upper limit temperature (approximately 470° C.) of the appropriate range. Because the exhaust gas temperature during lean operation is lower than the exhaust gas temperature during stoichiometric operation, the SCR temperature that increases during stoichiometric operation decreases upon switching to lean operation.

However, in a case where the temperature of the SCR is a high temperature exceeding the upper limit temperature, oxidation of $NH_3$ at the SCR also continues for a while after switching. In this case, some of the $NH_3$ generated by execution of a rich spike is oxidized before being adsorbed by the SCR, and consequently the $NH_3$ adsorbed on the SCR is also gradually oxidized. As a result, the adsorption amount of $NH_3$ cannot be adequately restored even after execution of the rich spike, and this leads to a decline in the NOx purifying performance of the SCR.

The present disclosure has been conceived in consideration of the above described problem, and an object of an example in the present disclosure is to provide a control device for an internal combustion engine that can suppress the occurrence of a decline in the NOx purifying performance of an SCR that is caused by $NH_3$ generated at an NSR upstream thereof oxidizing under a high temperature environment.

A control device for an internal combustion engine according to an example in the present disclosure controls an internal combustion engine that includes a selective catalytic reduction-type catalyst disposed in an exhaust passage, a NOx storage-reduction catalyst disposed upstream relative to the selective catalytic reduction-type catalyst in the exhaust passage, and an EGR (Exhaust Gas Recirculation) apparatus that causes EGR gas to recirculate from the exhaust passage to an intake passage. In an example in the present disclosure, a NOx storage-reduction catalyst also includes a catalyst obtained by providing a three-way catalyst with a NOx storage function.

Operation modes of the internal combustion engine that are selected by the present control device include at least a lean mode and a stoichiometric mode. The lean mode is an operation mode in which operation is performed in a state in which an in-cylinder air-fuel ratio is controlled to an air-fuel ratio that is leaner in fuel than a theoretical air-fuel ratio. The stoichiometric mode is an operation mode in which operation is performed in a state in which the in-cylinder air-fuel ratio is controlled to the theoretical air-fuel ratio. An operating region in which the lean mode is selected and an operating region in which the stoichiometric mode is selected may be set as different regions to each other. In such a case, preferably the stoichiometric mode is selected in an operating region in which the torque is higher in comparison to an operating region in which the lean mode is selected. More specifically, preferably the stoichiometric mode is selected in an operating region in which the torque exceeds an upper limit torque in the lean mode.

The present control device includes first control means. The first control means is configured to execute a rich spike that supplies excessive fuel relative to the theoretical air-fuel ratio, during a period in which the operation mode is switched from the stoichiometric mode to the lean mode. A specific method for executing the rich spike is not limited. For example, a configuration may be adopted in which a fuel injection amount for fuel injection that contributes to torque is made excessive relative to the theoretical air-fuel ratio, or a configuration may be adopted in which a total fuel injection amount is made excessive relative to the theoretical air-fuel ratio by performing post-injection of fuel that does not contribute to torque separately from fuel injection that contributes to torque. A large amount of reducing agent will be included in exhaust gas as a result of executing the rich spike. When the reducing agent is supplied to the NOx storage-reduction catalyst, NOx that is stored by the NOx storage-reduction catalyst reacts with the reducing agent and $NH_3$ is generated.

The present control device further includes second control means. The second control means is configured so that, in a case where the temperature of the selective catalytic reduction-type catalyst at a time of switching from the stoichiometric mode is greater than or equal to an upper limit temperature, after executing a rich spike, the second control means executes a predetermined transient control and thereafter switches to the lean mode. The term "at a time of switching from the stoichiometric mode" refers to a time point during execution of a rich spike or a time point at exactly the time that the rich spike ends. Preferably, the upper limit temperature is set to a temperature at which oxidation of $NH_3$ occurs, or a temperature in the vicinity thereof. In the transient control, an EGR rate that is a proportion of EGR gas included in intake gas is made higher than an EGR rate in the lean mode, and the in-cylinder air-fuel ratio is made an air-fuel ratio that is leaner in fuel than the theoretical air-fuel ratio and is richer in fuel than an air-fuel ratio in the lean mode. In this case, the term "EGR rate in the lean mode" refers to an EGR rate that is set in a case where the internal combustion engine is operating in the lean mode, and is an EGR rate that is set at a time that the internal combustion engine is in a steady state. The set EGR rate also includes zero. The term "air-fuel ratio in the lean mode" refers to an air-fuel ratio which is set in a case where the internal combustion engine is operating in the lean mode and which is an air-fuel ratio when the internal combustion engine is in a steady state. Further, the term "steady state" refers to a state in which the speed and torque of the internal combustion engine are constant.

According to the present control device configured as described above, in a situation in which the temperature of the selective catalytic reduction-type catalyst is greater than or equal to an upper limit temperature and it is possible for oxidation of $NH_3$ to occur, by making the EGR rate higher than the set EGR rate for the lean mode, the oxygen concentration in exhaust gas is lowered, and oxidation of $NH_3$ under a high temperature environment is suppressed. By this means, the adsorption amount of $NH_3$ of the selective catalytic reduction-type catalyst can be adequately restored, and a decline in the NOx purifying performance of the SCR after switching to the lean mode can be suppressed. Further, at the same time, by making the in-cylinder air-fuel ratio an air-fuel ratio that is richer in fuel than the set air-fuel ratio for the lean mode, destabilization of combustion due to an increase in the EGR rate can be suppressed.

The second control means may be configured to execute the aforementioned transient control until the temperature of the selective catalytic reduction-type catalyst becomes lower than the upper limit temperature. Although fuel consumption performance progressively declines in a period in which the in-cylinder air-fuel ratio is made richer in fuel than the set air-fuel ratio for the lean mode, a time when oxidation of $NH_3$ occurs is a time when the selective catalytic reduction-type catalyst is at a high temperature, it is not necessary to raise the EGR rate to lower the oxygen concentration as long as the temperature of the selective catalytic reduction-type catalyst decreases. Consequently, if a period in which the transient control is executed is adjusted as described above, a decline in the NOx purifying performance of the selective catalytic reduction-type catalyst can be suppressed by oxidation of $NH_3$, without wastefully lowering the fuel consumption performance.

The second control means may be configured to actuate the EGR apparatus so that the EGR rate becomes a maximum EGR rate when executing the aforementioned transient control. The term "maximum EGR rate" used here refers to an EGR rate obtained at a time that an actuation amount of the EGR apparatus is made a maximum amount on a side that increases the flow rate of EGR gas. By making the EGR rate the maximum rate, the oxygen concentration contained in exhaust gas can be minimized and oxidation of $NH_3$ can be more effectively suppressed.

In the stoichiometric mode, recirculation of EGR gas may be performed at a higher EGR rate than the set EGR rate for the lean mode. This is done to suppress the generation of NOx. In this case, the second control means may be configured to, in the aforementioned transient control, maintain the EGR rate at the set EGR rate for the stoichiometric mode. If the set EGR rate for the stoichiometric mode is the maximum EGR rate, it is preferable to actuate the EGR apparatus to make the EGR rate the maximum rate in the transient control also.

The lean mode may include a first lean mode that does not perform recirculation of EGR gas, and a second lean mode that performs recirculation of EGR gas. The second lean mode is selected in an operating region in which the torque is higher than in an operating region in which the first lean mode is selected. This is because knocking is liable to occur in a high torque region, and recirculating EGR gas has the effect of suppressing the occurrence of knocking. On the other hand, when lean operation is performed according to the first lean mode, that is, when lean operation is performed using only fresh air and without recirculating EGR gas, there is an effect of increasing fuel consumption performance compared to a case where EGR gas is introduced. In this case, the second control means may be configured to execute the aforementioned transient control at both a time of switching from the stoichiometric mode to the first lean mode and a time of switching from the stoichiometric mode to the second lean mode, and may be configured to make the EGR rate in the transient control higher than the set EGR rate for the second lean mode.

As described above, according to the control device for an internal combustion engine of the present disclosure, in a case where the temperature of the selective catalytic reduction-type catalyst is greater than or equal to an upper limit temperature when switching from the stoichiometric mode to the lean mode, after execution of a rich spike, the EGR rate is made higher than a set EGR rate for the lean mode, and hence oxidation under a high temperature environment of $NH_3$ that is generated by the rich spike is suppressed, and thus a decline in the NOx purifying performance of the SCR can be suppressed. Further, after execution of the rich spike, the in-cylinder air-fuel ratio is made richer in fuel than the set air-fuel ratio for the lean mode, and hence destabilization of combustion due to an increase in the EGR rate is suppressed. By means of these advantageous effects, according to a control device for an internal combustion engine of the present disclosure, a deterioration in exhaust performance can be prevented when switching from the stoichiometric mode to the lean mode.

DESCRIPTION OF EMBODIMENTS

Embodiments are described hereunder with reference to the accompanying drawings. However, it is to be understood that even when the number, quantity, amount, range or other numerical attribute of an element is mentioned in the following description of the embodiments, the present disclosure is not limited to the mentioned numerical attribute unless it is expressly stated or theoretically defined. Further, structures or steps or the like described in conjunction with the following embodiments are not necessarily essential to the present disclosure unless expressly stated or theoretically defined.

1. System Configuration of Embodiment

Figure 1:
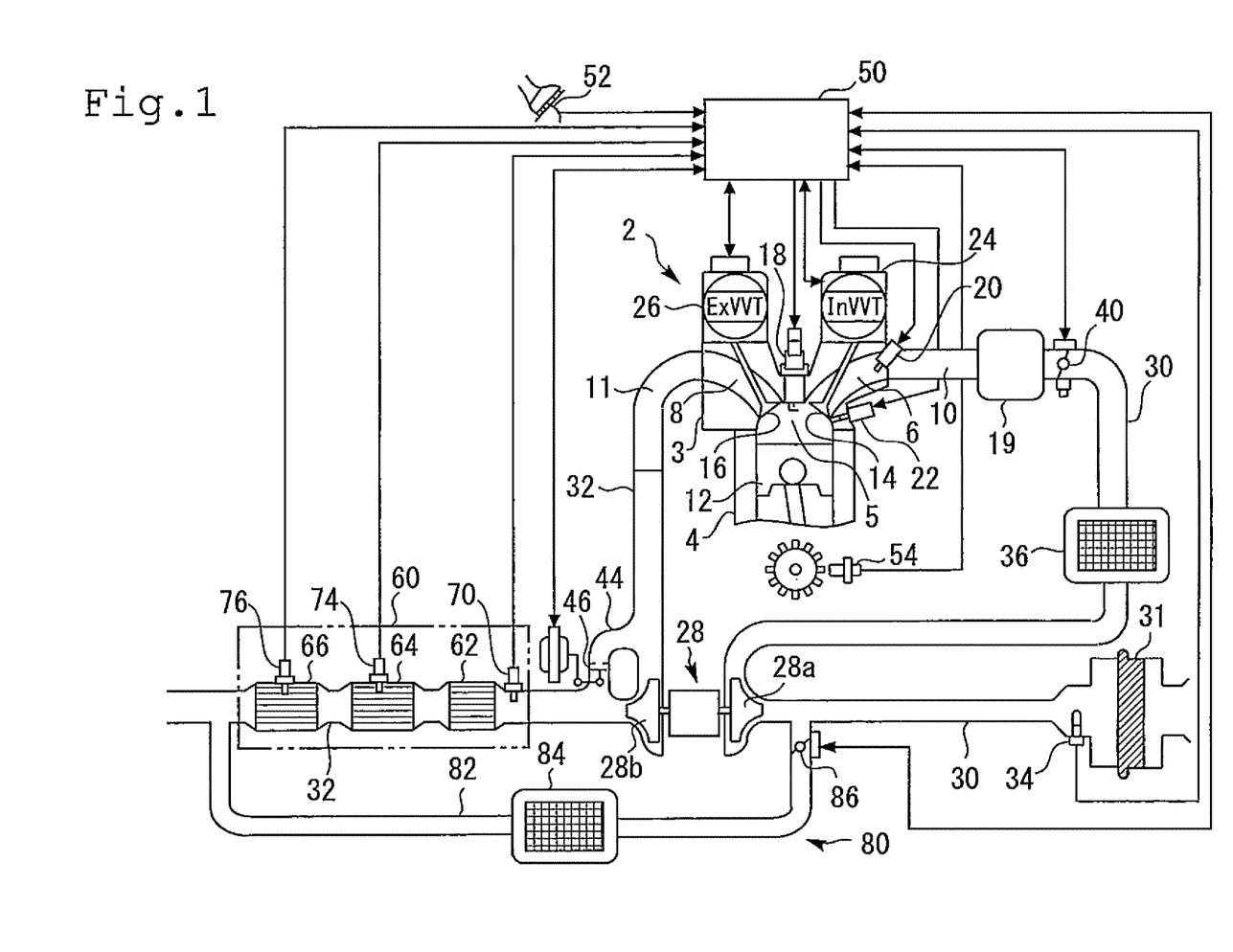
FIG. 1 is a view illustrating the configuration of a system according to an embodiment.

FIG. 1 is a view illustrating the configuration of a system according to an embodiment. The system according to the present embodiment includes an internal combustion engine (hereunder, referred to as simply "engine") 2 that is mounted as a power apparatus in an automobile. The number of cylinders and cylinder arrangement of the engine 2 is not particularly limited.

The engine 2 includes a cylinder block 4 in which a piston 12 is disposed and a cylinder head 3. A space that is defined between the cylinder head 3 and the piston 12 forms a combustion chamber 5. The engine 2 is a spark-ignition type engine in which a spark plug 18 of an ignition device is installed in the cylinder head 3 so as to protrude into a top portion of the combustion chamber 5.

An intake port 6 and an exhaust port 8 that are formed in the cylinder head 3 respectively open in the combustion chamber 5. A communicating state between the combustion chamber 5 and the intake port 6 is controlled by an intake valve 14 provided in the cylinder head 3. A communicating state between the combustion chamber 5 and the exhaust port 8 is controlled by an exhaust valve 16 provided in the cylinder head 3. Variable valve apparatuses 24 and 26 which can vary a valve timing and a working angle are provided for the intake valve 14 and the exhaust valve 16, respectively.

An in-cylinder injection valve 22 that injects fuel directly into the combustion chamber 5, and a port injection valve 20 that injects fuel into the intake port 6 are installed in the cylinder head 3. The in-cylinder injection valve 22 is disposed below the intake port 6 so as to inject fuel towards the center of the combustion chamber 5 from an intake side of the combustion chamber 5.

An intake manifold 10 is connected to the intake port 6 of the cylinder head 3. The intake manifold 10 includes a surge tank 19. An intake passage 30 that guides air that is taken in from an air cleaner 31 is connected to the surge tank 19. An electronically controlled throttle valve 40 is provided in the intake passage 30. An exhaust manifold 11 is connected to the exhaust port 8 of the cylinder head 3. An exhaust passage 32 that discharges exhaust gas to the outside is connected to the exhaust manifold 11. An exhaust purification apparatus 60 is disposed in the exhaust passage 32.

The engine 2 has a turbocharger 28. A compressor 28a of the turbocharger 28 is provided upstream of the throttle valve 40 in the intake passage 30. An intercooler 36 that cools intake air that is compressed by the compressor 28a is provided between the compressor 28a and the throttle valve 40. A turbine 28b of the turbocharger 28 is provided upstream of the exhaust purification apparatus 60 in the exhaust passage 32. A bypass passage 44 that bypasses the turbine 28b is provided in the exhaust passage 32. An electronically controlled waste gate valve 46 is installed in the bypass passage 44.

The engine 2 includes an EGR apparatus 80 that recirculates a part of exhaust gas from the exhaust passage 32 to the intake passage 30. The EGR apparatus 80 is an LPL-EGR apparatus (low-pressure EGR apparatus) that includes an EGR passage 82 that branches from the exhaust passage 32 at a position that is downstream relative to the exhaust purification apparatus 60, and connects to the intake passage 30 at a position that is upstream relative to the compressor 28a. An EGR cooler 84 is disposed on the upstream side of a flow of EGR gas in the EGR passage 82, and an EGR valve 86 is disposed on a downstream side of the flow of EGR gas.

The exhaust purification apparatus 60 is constituted by a start catalyst (hereunder, referred to as "SC") 62 that is a three-way catalyst, a NOx storage-reduction catalyst (hereunder, referred to as "NSR") 64, and a selective catalytic reduction-type catalyst (hereunder, referred to as "SCR") 66. The SC 62, NSR 64 and SCR 66 are disposed in that order from the upstream side in the exhaust passage 32.

Under a lean atmosphere in which the oxygen concentration is high, the SC 62 reduces NOx contained in exhaust gas to $N_2$ while adsorbing oxygen contained in the exhaust gas. Under a rich atmosphere in which there is a low oxygen concentration, the SC 62 oxidizes HC and CO contained in exhaust gas while releasing oxygen to thereby change the HC and CO to $H_2O$ and $CO_2$.

Under a lean atmosphere in which the oxygen concentration is high, the NSR 64 stores NOx that is contained in exhaust gas, in the state of a nitrate. Subsequently, when HC, CO, $H_2$ or the like that serves as a reducing agent is supplied by means of a rich spike, the NSR 64 releases the stored NOx to cause the reducing agent and the NOx to react and thereby reduce the NOx to $NH_3$ and $N_2$.

The SCR 66 adsorbs $NH_3$ that is generated in the NSR 64 as a result of the rich spike. The SCR 66 causes the adsorbed $NH_3$ and NOx contained in exhaust gas to react to reduce the NOx to $N_2$. Note that, when a reducing agent is supplied by means of a rich spike, a reaction between NOx contained in exhaust gas and the reducing agent also occurs at the SC 62, and $NH_3$ is generated from the NOx. Consequently, the $NH_3$ that is adsorbed by the SCR 66 also includes $NH_3$ generated at the SC 62, in addition to the $NH_3$ generated at the NSR 64.

The system of the present embodiment includes sensors for obtaining information relating to the operating state of the engine 2 at various places. An air flow meter 34 for measuring a fresh air intake amount is arranged directly downstream of the air cleaner 31 in the intake passage 30. A limiting-current type air-fuel ratio sensor 70 is arranged directly upstream of the SC 62 in the exhaust passage 32. A temperature sensor 74 is attached to the NSR 64 for measuring the temperature thereof (more specifically, a bed temperature). A temperature sensor 76 is attached to the SCR 66 for measuring the temperature thereof (more specifically, a bed temperature). In addition, the system of the present embodiment also includes an accelerator position sensor 52 for measuring a depression amount (accelerator opening degree) of an accelerator pedal, and a crank angle sensor 54 for measuring a crank angle of the engine 2. In addition to the aforementioned sensors, various sensors such as a combustion pressure sensor, an intake air pressure sensor, a supercharging pressure sensor, and a NOx sensor (none of which are illustrated in the drawings) are mounted in the engine 2 or the vehicle.

The various sensors and actuators described above are electrically connected to a control device 50. The control device 50 is an ECU (electronic control unit) that has at least an input/output interface, a ROM, a RAM and a CPU. The input/output interface takes in sensor signals from various sensors mounted in the engine 2 and the vehicle, and also outputs actuating signals to actuators provided in the engine 2. The actuators include the port injection valve 20, the in-cylinder injection valve 22, the ignition apparatus including the spark plug 18, the throttle valve 40, the waste gate valve 46, the EGR valve 86, and the variable valve apparatuses 24 and 26 and the like. Various kinds of control data including various control programs for controlling the engine 2 and maps are stored in the ROM. The CPU reads out a control program from the ROM and executes the control program, and generates actuating signals based on sensor signals that are taken in.

2. Operation Modes of Engine

Operation modes of the engine 2 that are selected by the control device 50 broadly include a stoichiometric mode that performs stoichiometric operation and a lean mode that performs lean operation. Stoichiometric operation is an operation in which the in-cylinder air-fuel ratio is controlled to the theoretical air-fuel ratio. Lean operation is an operation in which the in-cylinder air-fuel ratio is controlled to an air-fuel ratio that is leaner in fuel than the theoretical air-fuel ratio. In the present embodiment, the lean mode is further divided into a first lean mode that performs lean operation using only fresh air and without performing recirculation of EGR gas, and a second lean mode that performs recirculation of EGR gas. In the present embodiment, recirculation of EGR gas is also performed in the stoichiometric mode. Hereunder, the stoichiometric mode is referred to as "stoichiometric EGR mode", the first lean mode is referred to as "air lean mode", and the second lean mode is referred to as "lean EGR mode".

Figure 2:
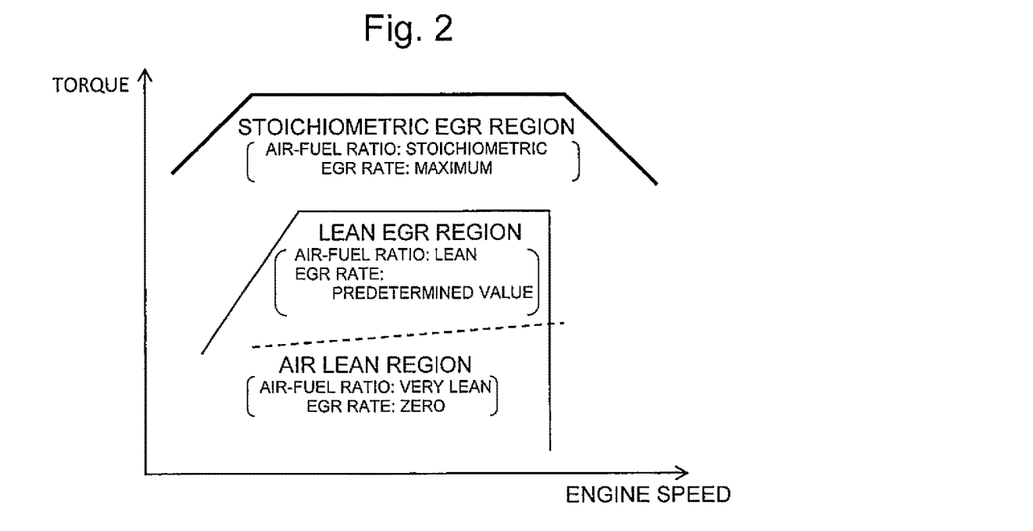
FIG. 2 is a view illustrating the relation between operation regions and operation modes.

FIG. 2 is a view illustrating a correlation between operation modes of the engine 2 that are selected by the control device 50, and the torque and engine speed. A polygonal line that is shown by a thick solid line in FIG. 2 is a boundary line between a region in which the engine 2 is capable of operating and a region in which the engine 2 is not capable of operating, and represents a maximum torque at each speed. Regions on a lower torque side than the boundary line are regions in which the engine 2 is capable of operating.

A polygonal line that is shown by a fine solid line in FIG. 2 is a boundary line between a region in which stoichiometric operation is performed and a region in which lean operation is performed, and represents a maximum torque that can be realized by lean operation at each speed. A region on a high torque side of this boundary line is a region in which stoichiometric operation is performed among the regions in which the engine 2 is capable of operating, that is, a region in which the stoichiometric EGR mode is selected (hereunder, referred to as "stoichiometric EGR region"). On the other hand, a region on a low torque side of this boundary line is a region in which lean operation is performed (hereunder, also referred to as "lean region"), that is, a region in which the air lean mode or the lean EGR mode is selected.

A straight line that is shown by a broken line in FIG. 2 is a boundary line between a region in which knocking is within an allowable range and a region in which knocking is not within an allowable range in a case where lean operation is performed using only fresh air. A region on a high torque side of this boundary line is a region in which recirculation of EGR gas is performed among the regions in which lean operation is performed, that is, a region in which the lean EGR mode is selected (hereunder, also referred to as "lean EGR region"). On the other hand, a region on a low torque side of the boundary line is a region in which lean operation is performed using only fresh air, that is, a region in which the air lean mode is selected (hereunder, also referred to as "air lean region").

In operation according to the stoichiometric EGR mode, a fuel injection amount is subjected to feedback control so that an output value of the air-fuel ratio sensor 70 becomes a reference value corresponding to the theoretical air-fuel ratio. With regard to fuel injection in the stoichiometric EGR mode, one of fuel injection by combined use of the port injection valve 20 and the in-cylinder injection valve 22, and fuel injection using only the in-cylinder injection valve 22 is selected according to the operating point of the engine 2. For example, in a region in which scavenging occurs as a result of supercharging, stoichiometric operation is performed by means of fuel injection in an intake stroke or a compression stroke by the in-cylinder injection valve 22. In the stoichiometric EGR mode, in order to recirculate as large an amount of EGR gas as possible to suppress the occurrence of NOx as much as possible, the degree of opening of the EGR valve 86 that is the actuation amount of the EGR apparatus 80 is controlled to the maximum degree of opening so that the EGR rate becomes a maximum.

In operation according to the air lean mode, the in-cylinder air-fuel ratio is set to a very lean air-fuel ratio (for example, a value around 26) that is made in lean in fuel to a degree that is close to a misfire limit. Further, in the air lean mode the EGR rate is set to zero and the EGR valve 86 is fully closed. With regard to fuel injection in the air lean mode, one of fuel injection by only the port injection valve 20, and fuel injection by combined use of the port injection valve 20 and the in-cylinder injection valve 22 is selected according to the operating point of the engine 2. The fuel injection by the port injection valve 20 is preferably asynchronous injection that is performed in a period in which the intake valve 14 is closed. However, the fuel injection by the port injection valve 20 may be synchronous injection in which a period in which the intake valve 14 is open and the fuel injection period overlap. The fuel injection by the in-cylinder injection valve 22 is an intake stroke injection that is performed in the intake stroke. Note that, in the air lean mode, the ignition timing is set to the MBT (Minimum (Spark Advance For) Best Torque).

In the operation according to the lean EGR mode, to suppress knocking by introducing EGR gas into the cylinders, the opening degree of the EGR valve 86 is controlled based on a previously set EGR rate. The set EGR rate in the lean EGR mode is set to as low a value as possible in a range that can effectively suppress knocking. Further, in the lean EGR mode, to adapt to a deterioration in the lean limit that is due to the introduction of EGR gas, the in-cylinder air-fuel ratio is set to an air-fuel ratio that is slightly richer in fuel than in the set air-fuel ratio. With regard to fuel injection in the lean EGR mode, one of fuel injection by only the port injection valve 20, fuel injection by combined use of the port injection valve 20 and the in-cylinder injection valve 22, and fuel injection by only the in-cylinder injection valve 22 is selected in accordance with the operating point of the engine 2. In this connection, in the lean EGR mode, although the effect of suppressing knocking is high compared to the air lean mode, the fuel consumption performance declines in comparison to the air lean mode in which the cooling loss is less. Consequently, a region in which the lean EGR mode is selected is limited to a region in which knocking will exceed an allowable level if operation is performed according to the air lean mode. Note that, in the lean EGR mode the ignition timing is set to the retardation side relative to the MBT.

In operation according to the air lean mode and operation according to the lean EGR mode, a rich spike is executed in accordance with a predetermined execution rule. A rich spike that is executed in the present embodiment is a process that temporarily changes the in-cylinder air-fuel ratio to an air-fuel ratio that is richer in fuel than the theoretical air-fuel ratio by increasing the fuel injection amount per cycle. An increase in the fuel injection amount for the purpose of a rich spike is performed with respect to fuel that is injected from the in-cylinder injection valve 22. By making the in-cylinder air-fuel ratio richer in fuel than the theoretical air-fuel ratio, the oxygen concentration contained in exhaust gas decreases and a large amount of reducing agents such as HC, CO and $H_2$ are generated. As a result of the exhaust gas that includes a large amount of reducing agents being supplied to the NSR 64, NOx stored by the NSR 64 is released from the NSR 64 and is reduced to $NH_3$ or $N_2$ on the NSR 64. Note that, a rich spike is executed at a time that the NOx concentration at the outlet of the NSR 64 that is measured by the NOx sensor (not illustrated) exceeds a predetermined threshold value, or at a time that a stored amount of NOx that is calculated by estimation based on the engine speed, the intake air amount, and the air-fuel ratio exceeds a predetermined threshold value.

3. Engine Control Relating to Switching of Operation Mode

The control device 50 calculates an output requested by the driver with respect to the engine 2 based on a depression amount of the accelerator pedal that is measured by the accelerator position sensor 52. Based on the requested output, the control device 50 determines a target operating point of the engine 2 that is defined by a target torque and a target speed, and selects the operation mode that is set in a region in which the target operating point is located. For example, in FIG. 2, in a case where the target operating point crosses the boundary line that is shown by the fine solid line to move from the high torque side to the low torque side, the control device 50 switches the operation mode from the stoichiometric EGR mode to the lean mode (air lean mode or lean EGR mode). Conversely, in a case where the target operating point crosses the boundary line that is shown by the fine solid line to move from the low torque side to the high torque side, the control device 50 switches the operation mode from the lean mode to the stoichiometric EGR mode.

However, in a case of switching the operation mode from the stoichiometric EGR mode to the lean mode, the control device 50 always performs switching to the lean mode after executing a rich spike. This processing is performed whether the lean mode is the air lean mode or the lean EGR mode. Because the exhaust gas temperature during stoichiometric operation is a high temperature, oxidation of $NH_3$ adsorbed on the SCR 66 occurs, and the $NH_3$ adsorption amount of the SCR 66 decreases significantly. Therefore, by executing a rich spike to generate $NH_3$ in the NSR 64, the $NH_3$ adsorption amount of the SCR 66 that decreases during stoichiometric operation can be restored. Note that, a period (number of cycles) in which to execute a rich spike is previously determined.

In a case of switching the operation mode from the stoichiometric EGR mode to the lean mode, after execution of a rich spike, if a predetermined condition is established, the control device 50 further executes transient control prior to switching to the lean mode. The predetermined condition is that the SCR temperature is greater than or equal to an upper limit temperature of a window. The SCR temperature that is used for the determination may be a value measured by the temperature sensor 76 or may be an estimated value calculated based on the temperature and flow rate of the exhaust gas. The window is set to a temperature range in which the SCR 66 effectively operates, and an upper limit temperature thereof is set to 470° C. at which an oxidation reaction of $NH_3$ occurs or a temperature in the vicinity of 470° C. The timing for making a determination regarding the SCR temperature is immediately before switching from the stoichiometric EGR mode is performed or at exactly a time point at which such switching is performed. The former timing includes a time point at which switching from the stoichiometric EGR mode to the lean mode is determined in accordance with movement of the target operating point. The latter timing includes a time point at which a rich spike is completed. In a case where the SCR temperature is greater than or equal to the upper limit temperature, because oxidation of $NH_3$ that is generated by a rich spike occurs, the $NH_3$ adsorption amount of the SCR 66 cannot be adequately restored. Therefore, control that is executed by the control device 50 is transient control that is described next.

The transient control that the control device 50 performs includes setting the EGR rate to a higher rate than the set EGR rate for the lean mode. By setting the EGR rate to at least a higher EGR rate than the set EGR rate for the lean mode, in comparison to a case of operating according to the settings in the lean mode, the oxygen concentration is relatively lowered and thus oxidation of $NH_3$ can be suppressed. However, since the oxygen concentration contained in the exhaust gas becomes lower as the EGR rate increases, according to the transient control of the present embodiment, the degree of opening of the EGR valve 86 is controlled so that the EGR rate becomes the maximum EGR rate. By making the EGR rate the maximum rate, the oxygen concentration contained in the exhaust gas can be made as low as possible and oxidation of $NH_3$ can be suppressed.

Further, the transient control that the control device 50 performs includes, during a period in which the EGR rate is higher than the set EGR rate for the lean mode, controlling the in-cylinder air-fuel ratio to an air-fuel ratio that is richer in fuel than the set air-fuel ratio for the lean mode. The reason that the in-cylinder air-fuel ratio during transient control is made richer in fuel than the set air-fuel ratio for the lean mode is to act as a countermeasure to a deterioration in the lean limit that is caused by introduction of EGR gas. The higher the EGR rate is, the more the lean limit deteriorates, and therefore the degree to which the in-cylinder air-fuel ratio is lean in fuel relative to the theoretical air-fuel ratio must be lowered. Because the EGR rate that is set in the transient control is higher than the set EGR rate for the lean EGR mode, the in-cylinder air-fuel ratio in the transient control is set to an air-fuel ratio that is richer in fuel than the set air-fuel ratio for the lean EGR mode.

The control device 50 continues the above described transient control until the SCR temperature becomes lower than the upper limit temperature. The exhaust gas temperature decreases as a result of making the in-cylinder air-fuel ratio leaner in fuel than the theoretical air-fuel ratio, and eventually the SCR temperature falls to a temperature that is within the window. If the SCR temperature falls to a temperature within the window, it is no longer necessary to raise the EGR rate and lower the oxygen concentration. Since the transient control is also one that lowers the degree to which the in-cylinder air-fuel ratio is lean in fuel, the longer that the transient control is continued, the greater the extent to which fuel consumption performance is lowered. Consequently, the control device 50 ends the transient control once the SCR temperature falls within the window and transitions to the original setting for the air lean mode and the lean EGR mode depending on the region in which the target operating point is located. By this means, a decrease in the NOx purifying performance of the SCR due to oxidation of $NH_3$ can be suppressed without wastefully lowering the fuel consumption performance.

The rich spike that the control device 50 performs while the operation mode is being switched from the stoichiometric EGR mode to the lean mode corresponds to a function as first control means. Further, the transient control that the control device 50 performs corresponds to a function as second control means. Note that, in a case of switching the operation mode from the lean mode to the stoichiometric EGR mode, special control such as the control described above is not performed.

Figure 3:
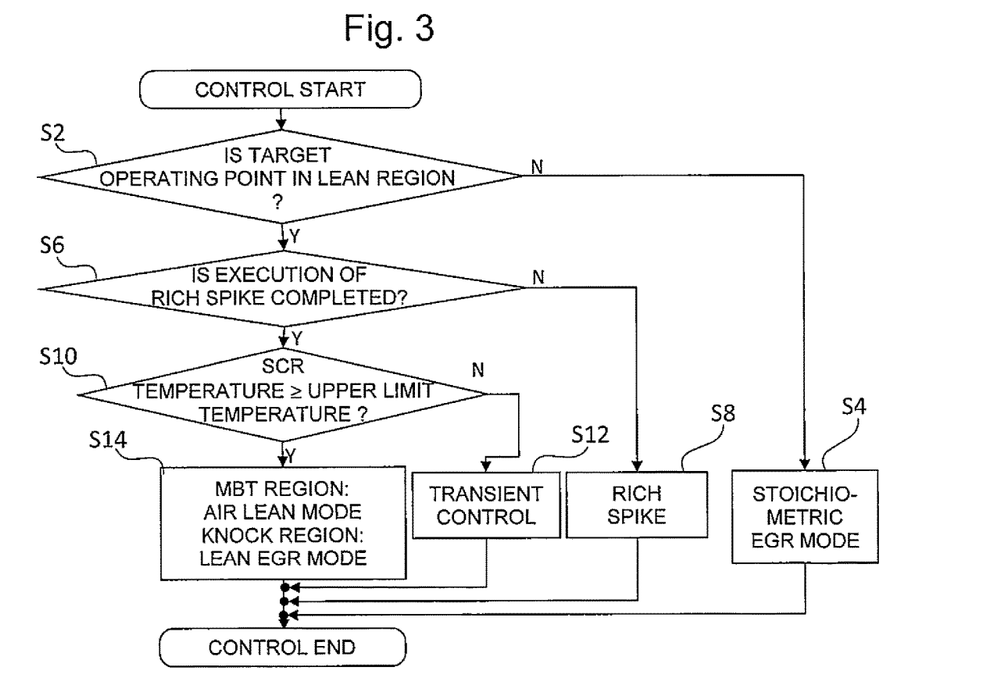
FIG. 3 is a flowchart illustrating a flow of engine control that relates to switching of an operation mode.

FIG. 3 is a flowchart illustrating the flow of engine control relating to switching of the operation mode. The control device 50 repeatedly executes the procedures shown in this flowchart at predetermined control periods that correspond to the clock speed of the ECU.

First, in step S2, a determination is performed as to whether or not the target operating point of the engine 2 is within a lean region that is a region in which lean operation is performed. If the target operating point is not within the lean region, the processing in step S4 is selected. In step S4, the stoichiometric EGR mode is selected as the operation mode, and operation of the engine 2 is performed according to the stoichiometric EGR mode.

If the target operating point is within the lean region, next, the determination in step S6 is performed. In step S6, it is determined whether or not execution of a rich spike that is executed when switching to lean operation is already completed. In a case where this is the first time that the target operating point enters the lean region with respect to the current switching operation, the result determined in step S6 is negative. Further, in a case where execution of a rich spike is in progress also, the result determined in step S6 is negative. If the result determined in step S6 is negative, the processing in step S8 is selected. In step S8, if this is the first time that the target operating point enters the lean region with respect to the current switching operation, a rich spike is started, while in a case where execution of a rich spike is in progress, execution of the rich spike is continued. The result determined in step S6 becomes affirmative when a previously determined execution period (number of cycles) elapses after the start of the rich spike.

In a case where execution of a rich spike is already completed, next a determination in step S10 is performed. In step S10, it is determined whether or not the SCR temperature is greater than or equal to the upper limit temperature. Note that the SCR temperature that is used for this determination may be an estimated value that is calculated based on the temperature and flow rate of exhaust gas. If the SCR temperature is greater than or equal to the upper limit temperature, the processing in step S12 is selected. In step S12, the transient control for suppressing oxidation of $NH_3$ generated by a rich spike is executed, and not control for performing operation at the original set EGR rate and set air-fuel ratio for the lean mode. The transient control continues to be performed until the SCR temperature becomes lower than the upper limit temperature.

In a case where the SCR temperature is lower than the upper limit temperature, the processing in step S14 is selected. In step S14, one of the air lean mode and the lean EGR mode is selected depending on which of the lean regions the target operating point is in, and the engine 2 is operated at the original set EGR rate and set air-fuel ratio for the air lean mode or the lean EGR mode. The air lean region in which the air lean mode is selected as the operation mode corresponds to, of the two lean regions, a region (MBT region) in which operation at the MBT is possible. The lean EGR region in which the lean EGR mode is selected as the operation mode corresponds to, of the two lean regions, a region (knock region) in which knocking occurs.

4. Operations of System Relating to Switching of Operation Mode

Figure 4:
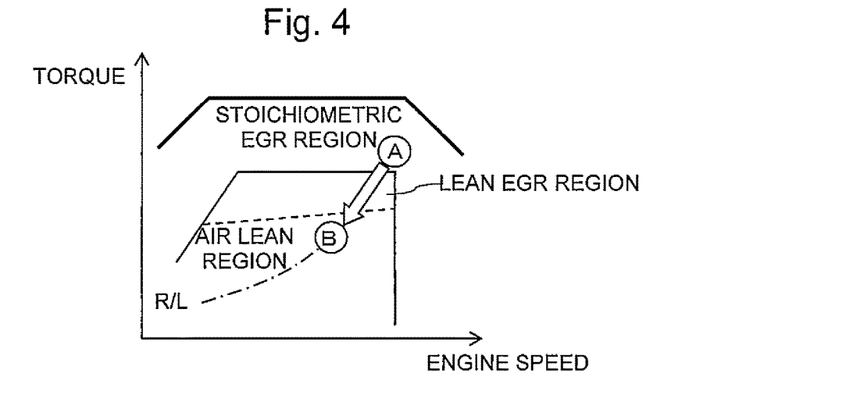
FIG. 4 is a view illustrating an example of movement of a target operating point at a time of deceleration.

4-1. Operations in Case of Transitioning from Stoichiometric EGR Mode to Air Lean Mode First, as shown in FIG. 4, operations of the system in a case where, in a state in which the target operating point of the engine 2 is in the stoichiometric EGR region, the requested output decreases as a result of a deceleration request, and the target operating point moves from an operating point A within the stoichiometric EGR region to an operating point B within the air lean region. Note that, in a case where a transmission gear ratio or a gear stage is fixed, the target operating point moves along a road load line (R/L) that is shown by an alternate long and short dashed line. The road load line is a curved line that links operating points at which the output of the engine 2 and the running load resistance balance out in a case where the transmission gear ratio or the gear stage is fixed.

Figure 5:
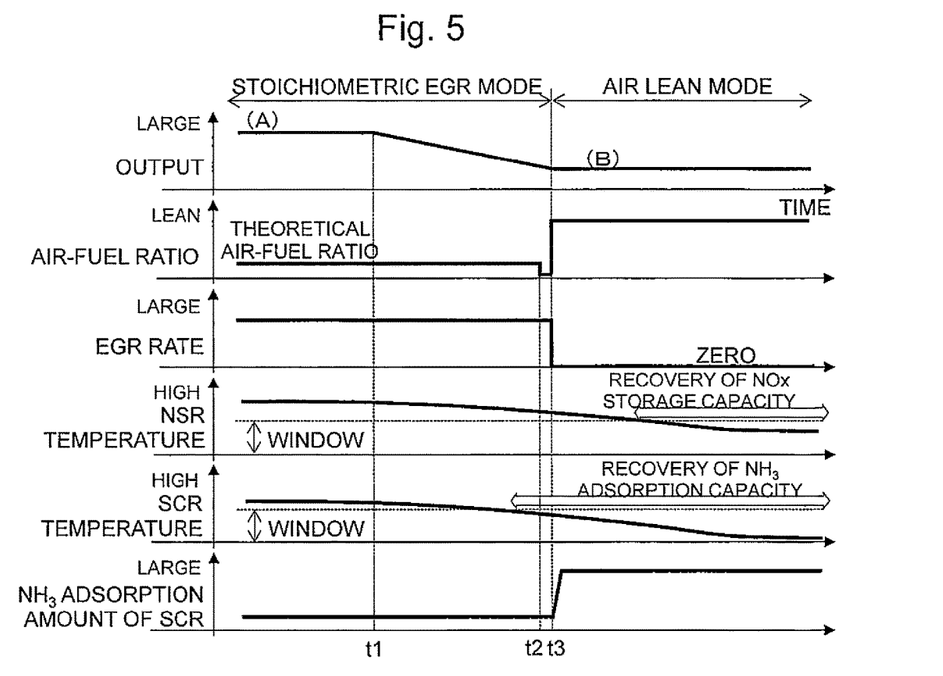
FIG. 5 is a time chart illustrating operations of the system at a time that an SCR temperature remains within a window in a case where the target operating point moves as shown in FIG. 4.

FIG. 5 is a time chart illustrating operations of the system at a time that the SCR temperature is within the window at a time of switching to the lean mode in a case where the target operating point moved as shown in FIG. 4 as a result of deceleration. The operations illustrated here are operations in a case where, in the processing flow illustrated in FIG. 3, the processing in step S14 is selected without passing through the processing in step S12. In the time chart, changes in accordance with time in the engine output, the in-cylinder air-fuel ratio, the EGR rate, the NSR temperature, the SCR temperature and the NH$_3$ adsorption amount of the SCR are illustrated.

According to this time chart, deceleration is started at a time t1, and a rich spike is executed at a time t2. This is because, at the time t2 or immediately prior thereto, the target operating point moves from the stoichiometric EGR region to the air lean region. The rich spike is executed for a predetermined period, and switching from the stoichiometric EGR mode to the air lean mode is performed at a time t3 at which the rich spike is completed.

The SCR temperature already falls within the window prior to the time t2 at which the rich spike is executed. Therefore, the NH$_3$ adsorption capacity of the SCR 66 is already restored at the time t3. In this case, the transient control of the lean mode is not performed, and from the time t3 onwards the engine 2 is operated at the original set EGR rate and set air-fuel ratio for the air lean mode. In the air lean mode, the set EGR rate is zero and the set air-fuel ratio is a very lean air-fuel ratio. Note that, in this time chart, a time that the NSR temperature falls within the window is a time that is after switching to the air lean mode at the time t3, and the NOx storage capacity of the NSR 64 is not restored for a while after switching. However, because the NH$_3$ adsorption capacity of the SCR 66 is already restored, NOx that is not captured at the NSR 64 can be purified at the SCR 66.

Figure 6:
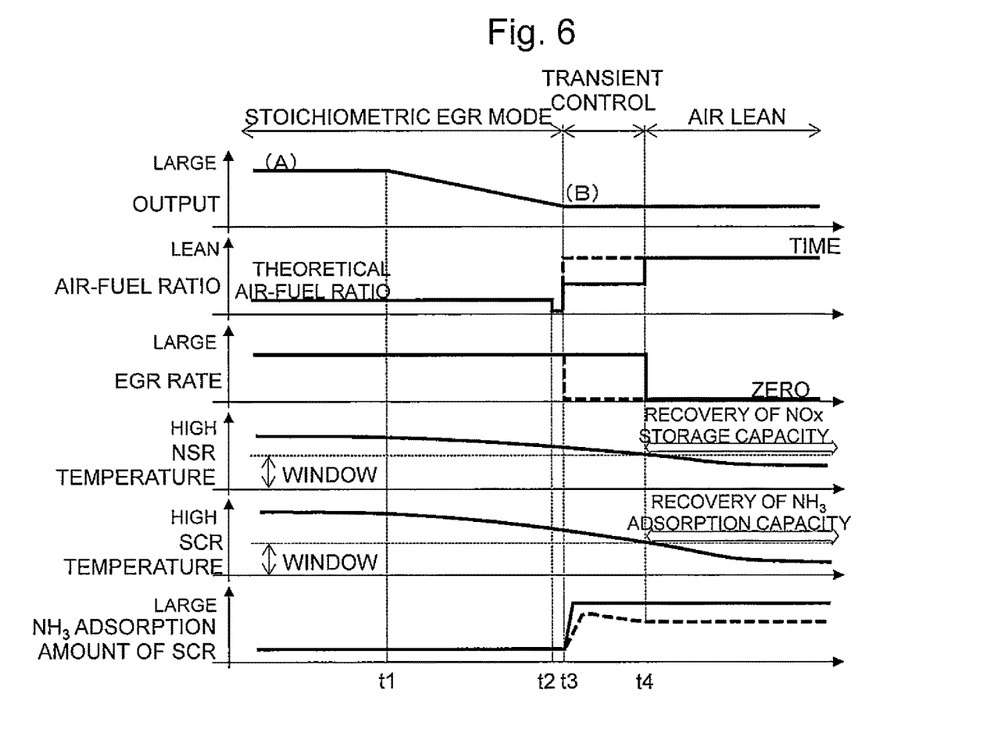
FIG. 6 is a time chart illustrating operations of the system at a time that the SCR temperature exceeds an upper limit of the window in a case where the target operating point moves as shown in FIG. 4.

FIG. 6 is a time chart illustrating operations of the system at a time that the SCR temperature when switching to the lean mode exceeds the window upper limit, in a case where the target operating point moves as shown in FIG. 4 as a result of deceleration. The operations illustrated in FIG. 6 are, with respect to the processing flow illustrated in FIG. 3, operations in a case where the processing in step S14 is selected after the processing in step S12 is repeated several times. In the time chart, changes in accordance with time in the engine output, the in-cylinder air-fuel ratio, the EGR rate, the NSR temperature, the SCR temperature and the NH$_3$ adsorption amount of the SCR are illustrated.

In this time chart also, deceleration is started at a time t1, and a rich spike is executed at a time t2. However, because the SCR temperature at a time t3 at which the rich spike is completed exceeds the upper limit temperature of the window, switching to the lean mode is not immediately performed. That is, the transient control is performed, and not operation at the original set EGR rate and set air-fuel ratio for the air lean mode. In the time chart, changes in accordance with time in the EGR rate and air-fuel ratio in a case where the transient control is executed are indicated by solid lines, and changes in accordance with time in the original EGR rate and air-fuel ratio of the air lean mode are indicated by broken lines.

The transient control is continued until a time t4 at which the SCR temperature falls within the window. When the SCR temperature falls within the window, the NH$_3$ adsorption capacity of the SCR 66 is restored. Until that time, the EGR rate is set so as to be higher than the original set EGR rate for the air lean mode. More specifically, the EGR valve 86 is actuated so that the degree of opening thereof is such that the maximum EGR rate that is the set EGR rate for the stoichiometric EGR mode is maintained. Since oxidation of NH$_3$ is suppressed under a high temperature environment by introduction of a large amount of EGR gas, the NH$_3$ adsorption amount of the SCR 66 can be swiftly restored and, further, a decrease in the NOx purifying performance of the SCR 66 after switching to lean operation can be suppressed. In the time chart, changes in accordance with time in the NH$_3$ adsorption amount of the SCR 66 in a case where the transient control is executed is indicated by a solid line, and changes in accordance with time in the NH$_3$ adsorption amount in a case where the transient control is not executed is indicated by a broken line.

Further, the in-cylinder air-fuel ratio during the transient control is controlled to an air-fuel ratio that, although leaner in fuel than the theoretical air-fuel ratio, is richer in fuel than the original set air-fuel ratio for the air lean mode. During a period in which the EGR rate is being raised, a destabilization in combustion due to an increase in the EGR rate can be suppressed by making the in-cylinder air-fuel ratio richer in fuel than the original set air-fuel ratio for the air lean mode.

4-2. Operations in Case of Transitioning from Stoichiometric EGR Mode to Lean EGR Mode Next, as shown in FIG. 7, operations of the system in a case where, in a state in which the target operating point of the engine 2 is in the stoichiometric EGR region, the requested output decreases as a result of a deceleration request, and the target operating point moves from the operating point A within the stoichiometric EGR region to an operating point C within the lean EGR region.

Figure 7:
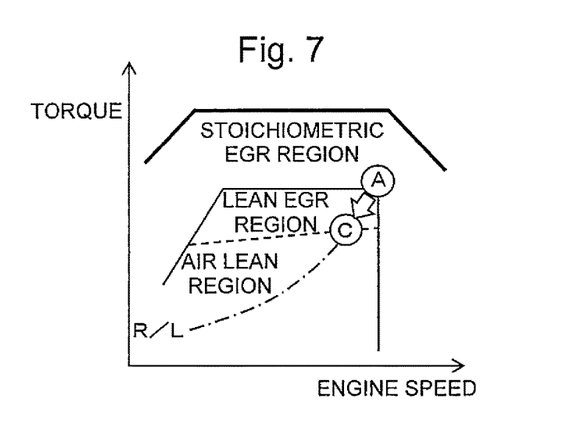
FIG. 7 is a view illustrating another example of the movement of a target operating point at a time of deceleration.
Figure 8:
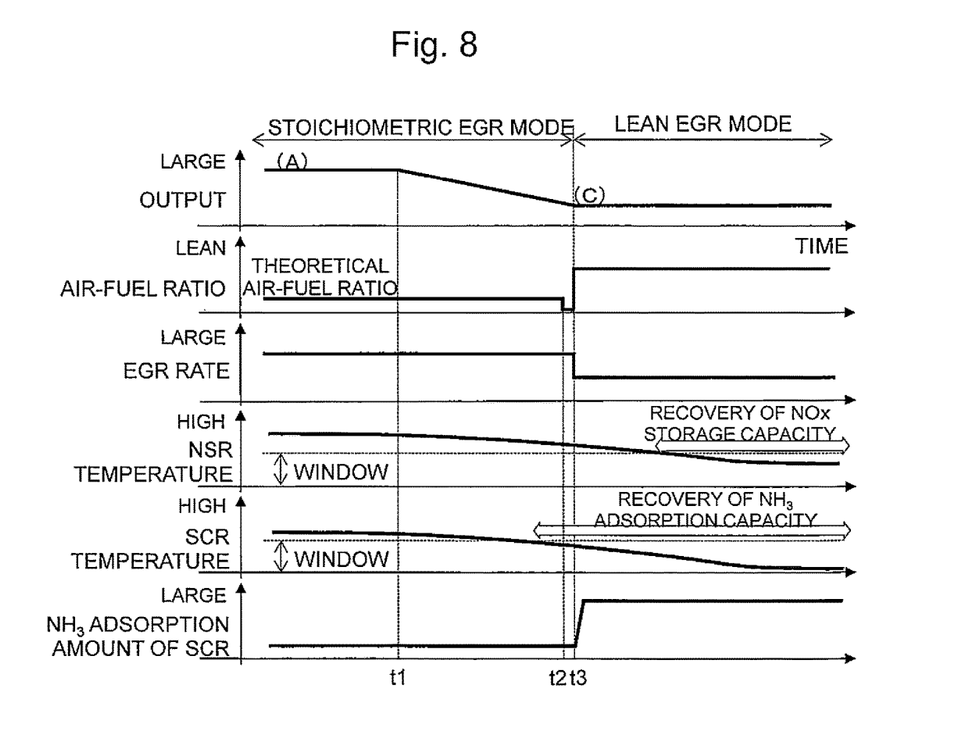
FIG. 8 is a time chart illustrating operations of the system at a time that the SCR temperature remains within a window in a case where the target operating point moves as shown in FIG. 7.

FIG. 8 is a time chart illustrating operations of the system at a time that the SCR temperature is within the window at a time of switching to the lean mode in a case where the target operating point moved as shown in FIG. 7 as a result of deceleration. The operations illustrated here are operations in a case where, in the processing flow illustrated in FIG. 3, the processing in step S14 is selected without passing through the processing in step S12. In the time chart, changes in accordance with time in the engine output, the in-cylinder air-fuel ratio, the EGR rate, the NSR temperature, the SCR temperature and the NH$_3$ adsorption amount of the SCR are illustrated.

The operations of the system until a time t3 shown in the time chart in FIG. 8 are the same as operations shown in the time chart in FIG. 5, and hence a description thereof is omitted. In this time chart, switching from the stoichiometric EGR mode to the lean EGR mode is performed at a time t3 at which a rich spike is completed. Since the SCR temperature at the time t3 in a lower temperature than the window upper limit, the transient control is not performed. From the time t3, operation is performed at the original set EGR rate and set air-fuel ratio for the lean EGR mode. The set EGR rate for the lean EGR mode is set to a lower value than the set EGR rate for the stoichiometric EGR mode. The set air-fuel ratio for the lean EGR mode is set to an air-fuel ratio that is richer in fuel than the set air-fuel ratio for the air lean mode.

Figure 9:
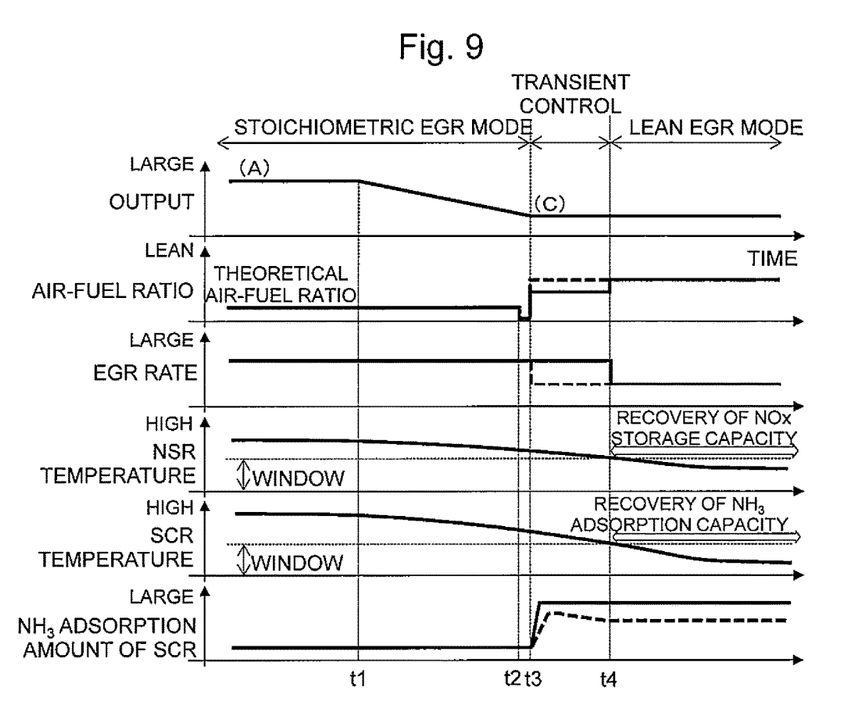
FIG. 9 is a time chart illustrating operations of the system at a time that the SCR temperature exceeds an upper limit of the window in a case where the target operating point moves as shown in FIG. 7.

FIG. 9 is a time chart illustrating operations of the system at a time that the SCR temperature when switching to the lean mode exceeds the window upper limit, in a case where the target operating point moves as shown in FIG. 7 as a result of deceleration. The operations illustrated in FIG. 9 are, with respect to the processing flow illustrated in FIG. 3, operations in a case where the processing in step S14 is selected after the processing in step S12 is repeated several times. In the time chart, changes in accordance with time in the engine output, the in-cylinder air-fuel ratio, the EGR rate, the NSR temperature, the SCR temperature and the NH$_3$ adsorption amount of the SCR are illustrated.

The operations of the system until a time t3 shown in the time chart in FIG. 9 are the same as operations shown in the time chart in FIG. 6, and hence a description thereof is omitted. According to this time chart, because the SCR temperature at a time t3 at which a rich spike is completed exceeds the upper limit temperature of the window, after execution of the rich spike, the transient control is performed, and not operation at the original set EGR rate and set air-fuel ratio for the lean EGR mode. In the time chart, changes in accordance with time in the EGR rate and air-fuel ratio in a case where the transient control is executed are indicated by solid lines, and changes in accordance with time in the original EGR rate and air-fuel ratio for the lean EGR mode are indicated by broken lines.

The transient control is continued until a time t4 at which the SCR temperature falls within the window. During the period until the time t4, the EGR rate is maintained at the maximum EGR rate that is the set EGR rate for the stoichiometric EGR mode. By this means, an amount of EGR gas is introduced that is larger than the amount of EGR gas that is introduced in the lean EGR mode, and hence oxidation of $NH_3$ under a high temperature environment is suppressed. In the time chart, changes in accordance with time in the $NH_3$ adsorption amount of the SCR 66 in a case where the transient control is executed are illustrated by a solid line, and changes in accordance with time in the $NH_3$ adsorption amount in a case where the transient control is not executed are illustrated by a broken line. By executing the transient control, the $NH_3$ adsorption amount of the SCR 66 can be swiftly recovered, and further, a decrease in the NOx purifying performance of the SCR 66 after switching to lean operation can be suppressed.

Further, the in-cylinder air-fuel ratio during the transient control is controlled to an air-fuel ratio that, although leaner in fuel than the theoretical air-fuel ratio, is richer in fuel than the original set air-fuel ratio for the lean EGR mode. During a period in which the EGR rate is being raised, a destabilization in combustion due to an increase in the EGR rate can be suppressed by making the in-cylinder air-fuel ratio richer in fuel than the original set air-fuel ratio for the lean EGR mode.

5. Other Embodiments

Although in the above described embodiment, in the stoichiometric EGR mode, the degree of opening of the EGR valve is set to the maximum degree to control the EGR rate to the maximum rate, a configuration may also be adopted in which the set EGR rate for the stoichiometric EGR mode is set lower than the maximum EGR rate. Further, it is not necessary to set the EGR rate for the transient control to the same rate as the set EGR rate for the stoichiometric EGR mode, and it is sufficient to set the EGR rate for the transient control to a rate that is higher than the set EGR rate for the lean mode.

A rich spike is not limited to the rich spike described in the above embodiment, as long as the rich spike is a method that can supply excessive fuel relative to the theoretical air-fuel ratio. For example, by injecting fuel in an expansion stroke or an exhaust stroke by means of the in-cylinder injection valve 22 or the like, post-injection of fuel that does not contribute to torque may be performed separately to fuel injection that contributes to torque. Further, a method can also be adopted in which fuel injected into the intake port 6 from the port injection valve 20 during a period in which the intake valve 14 is closed is blown through to the exhaust port 8 utilizing scavenging. Note that, apart from the position shown in FIG. 1, the in-cylinder injection valve 22 can also be disposed side by side with the spark plug 18 at the top portion of the combustion chamber 5.

Although the engine according to the above described embodiments is a turbocharged engine, the present disclosure can also be applied to a naturally aspirated engine that does not include a turbocharger.

What is claimed is:

1. A control device for an internal combustion engine that comprises a selective catalytic reduction-type catalyst disposed in an exhaust passage, a NOx storage-reduction catalyst disposed upstream relative to the selective catalytic reduction-type catalyst in the exhaust passage, and an EGR (Exhaust Gas Recirculation) apparatus that recirculates EGR gas from the exhaust passage to an intake passage, wherein:

operation modes of the internal combustion engine that are selected by the control device include:

a stoichiometric mode that controls an in-cylinder air-fuel ratio to a theoretical air-fuel ratio and performs an operation, and a lean mode that controls the in-cylinder air-fuel ratio to an air-fuel ratio that is leaner in fuel than the theoretical air-fuel ratio and performs an operation;

the control device including at least an input/output interface, a ROM, a RAM and a CPU, the control device is configured to, during a period in which the operation mode is switched from the stoichiometric mode to the lean mode, execute a rich spike that supplies excessive fuel relative to the theoretical air-fuel ratio, and in a case where a temperature of the selective catalytic reduction-type catalyst at a time of switching from the stoichiometric mode is greater than or equal to an upper limit temperature, after execution of the rich spike, to switch to the lean mode after executing transient control that makes an EGR rate that is a proportion of EGR gas included in intake gas higher than an EGR rate in the lean mode, and makes the in-cylinder air-fuel ratio an air-fuel ratio that is leaner in fuel than the theoretical air-fuel ratio and is richer in fuel than an air-fuel ratio in the lean mode.

2. The control device for the internal combustion engine according to claim 1, wherein the control device is configured to further execute the transient control until the temperature of the selective catalytic reduction-type catalyst becomes lower than the upper limit temperature.

3. The control device for the internal combustion engine according to claim 1, wherein, in the transient control, the control device is configured to further actuate the EGR apparatus so that the EGR rate becomes a maximum.

* * * * *